United States Patent [19]

Merrill

[11] 4,099,859
[45] * Jul. 11, 1978

[54] CONTACT LENS HAVING A SMOOTH SURFACE LAYER OF A HYDROPHILIC POLYMER

[75] Inventor: Edward W. Merrill, Cambridge, Mass.

[73] Assignee: High Voltage Engineering Corporation, Burlington, Mass.

[ * ] Notice: The portion of the term of this patent subsequent to Oct. 28, 1992, has been disclaimed.

[21] Appl. No.: 754,892

[22] Filed: Dec. 27, 1976

Related U.S. Application Data

[60] Continuation of Ser. No. 528,681, Dec. 2, 1974, abandoned, which is a division of Ser. No. 311,819, Dec. 4, 1972, Pat. No. 3,916,033, which is a continuation-in-part of Ser. No. 299,711, Oct. 24, 1972, abandoned, which is a continuation-in-part of Ser. No. 172,538, Aug. 17, 1971, abandoned, which is a continuation-in-part of Ser. No. 151,377, Jun. 9, 1971, abandoned.

[51] Int. Cl.² ............................ G02C 7/04; C08F 2/54
[52] U.S. Cl. .................................. 351/160; 204/159.13; 351/177; 427/36
[58] Field of Search .................. 351/160, 177; 427/36; 204/159.13

[56] References Cited

U.S. PATENT DOCUMENTS

| | | | |
|---|---|---|---|
| 3,621,079 | 11/1971 | Leeds | 351/160 X |
| 3,700,573 | 10/1972 | Laizier et al. | 351/160 X |
| 3,700,761 | 10/1972 | O'Driscoll et al. | 351/160 X |
| 3,745,042 | 7/1973 | Lim et al. | 351/160 X |
| 3,916,033 | 10/1975 | Merrill | 351/160 X |

Primary Examiner—John K. Corbin
Attorney, Agent, or Firm—Russell & Nields

[57] ABSTRACT

A contact lens comprising a silicone polymer or copolymer core and a hydrophilic polymer surface grafted to the core is formed by contacting a silicone with a free radical polymerizable precursor to the polymer in a liquid state and subjecting the precursor and silicone to a high dose of ionizing radiation for a short period. The radiation dose, time of radiation and temperature are controlled to produce an optically clear contact lens by forming a smooth surface of the polymer grafted to the silicone, preventing substantial migration of the precursor into the silicone and preventing localized high concentration of hydrophilic polymer on the silicone surface.

6 Claims, 12 Drawing Figures

CONTACT LENS HAVING A SMOOTH SURFACE LAYER OF A HYDROPHILIC POLYMER

This application is a continuation of application Ser. No. 528,681, filed Dec. 2, 1974, now abandoned. Said Ser. No. 528,681 was a division of application Ser. No. 311,819 filed Dec. 4, 1972 entitled "CONTACT LENS AND THE METHOD OF PREPARATION" now U.S. Pat. No. 3,916,033. Said Ser. No. 311,819 was a continuation-in-part of, and co-pending with, application Ser. No. 299,711 filed Oct. 24, 1972 entitled "CONTACT LENS", abandoned December 10, 1973. Said application Ser. No. 299,711 was a continuation-in-part of, and co-pending with application Ser. No. 172,538 filed Aug. 17, 1971 entitled "CONTACT LENS", abandoned Sept. 3, 1973. Said Ser. No. 172,538 was a continuation-in-part of, and co-pending with application Ser. No. 151,377 filed June 9, 1971 entitled "CONTACT LENS", abandoned Oct. 26, 1972.

BACKGROUND OF THE INVENTION

This invention relates to an oxygen-permeable hydrophilic contact lens and its method of preparation.

Presently, contact lenses are made from optically clear substances which may be either rigid or flexible and may or may not be hydrophilic. Though the most common contact lenses are intended to cover only the cornea, and thus have a diameter of about 9 mm., scleral lenses embodying this invention may prove ultimately more convenient. Scleral lenses can be made with diameters as great as 2.0 cm. The most commonly used substances have been mineral glass or clear plastic materials such as polymethyl methacrylate. While these substances are optically satisfactory, their use is disadvantageous since they are substantially impermeable to oxygen. Since the cornea is an avascular organ and depends upon oxygen diffusing to it from the atmosphere for its vitality, frequent removal of the impermeable contact lens is necessary so that the cornea may remain viable. In addition, contact lenses made from glass or rigid polymeric material may not be fitted precisely over the cornea or may not be wettable sufficiently by water so that an air gap may develop between the cornea and the contact lens producing drastic aberration in the optical path because of the discontinuity of the interface between the cornea and the contact lens. To overcome this latter problem, hydrogels containing substantial quantities of water, in excess of 30 or 40% by weight, have been employed. These lenses have the advantage of optical clarity and flexibility making them more comfortable during use. However, their permeability to oxygen is relatively poor so that even though comfortable, they must be removed frequently to permit contact of the cornea with oxygen.

It has been proposed to form a contact lens from an oxygen-permeable silicone core which is rendered hydrophilic by grafting a hydrophilic vinyl monomer to its surface. British Pat. No. 1,170,810 and corresponding French Pat. No. 1,526,934 to Laizier et al. disclose a process for rendering the surface of a silicone contact lens hydrophilic by irradiating uncross linked silicone in the presence of free oxygen to crosslink the silicone while forming peroxide radicals therein (especially at the surface) and subsequently immersing the crosslinked silicone in a vinyl monomer at an elevated temperature for a period of about one-half hour to about two hours. The monomer is grafted to the silicone by free-radical polymerization chemically initiated by the previously formed peroxide. This process is time-consuming and the contact lens produced by this process is undesirable for a number of reasons. First, the grafting polymerization must be conducted at temperature levels and over periods of time under which the vinyl monomer is capable of periods of time under which the vinyl monomer is capable of diffusing into and swelling, previously grafted polymer chains, thereby producing irregular regions of proliferating grafting by a positive feedback effect. In other words, after the very first grafting to the hydrophilic silicone surface has been accomplished the new surface is much more absorptive to the monomer. The monomer is thermodynamically compelled to swell the grafted hydrophilic polymer and further irradiation will produce additional grafting in regions already reached in the monomer. Thus the process is one of positive feedback and can lead to gross differences in amount of grafted hydrophilic polymer per unit area of silicone substrate. Upon subsequent immersion in water the more grafted regions swell to the greater degree, thereby distorting the interface and producing undesirable optical dispersion. Secondly, reliance only on peroxide radicals to vitiate grafting is undesirble since the peroxide groups may subsequently undergo cleavage, releasing the grafted hydrophilic monomer.

The Lazier et al patent also notices that prior attempts to irradiate mutually a silicone and N-vinyl pyrrolidone have resulted in unsatisfactory products since the optical characteristics of the silicone were not retained after irradiation.

Accordingly, it would be highly desirable to form a contact lens structure which is flexible, optically clear, water wettable and highly permeable to oxygen, by a more simple and controllable process. Such a lens would be comfortable to wear, permitting natural lubrication of tear fluid against the moving eye lid, would ensure gas-free contact with the cornea at the cornea-lens interface and would eliminate the need for frequent removal of the contact lens to permit contact of the cornea with oxygen.

SUMMARY OF THE INVENTION

This invention provides a contact lens, or members thereof, made from an oxygen-permeable silicone polymer or copolymer optically clear in the corneal area, having grafted onto its surface a thin layer of an optically clear hydrophilic polymer. By one method, the contact lens is produced by contacting a silicone polymer lens blank, either cross-linked or uncrosslinked, with polymerizable monomer, for instance by immersing the blank in a liquid containing monomer, and exposing the silicone while thus immersed to a high dose of ionizing radiation for a short period to form a hydrophilic polymer grafted to the silicone surface. Grafting is conducted under conditions which prevent the development of mechanical or physical-chemical stresses that can distort the silicone surface either immediately or upon later exposure to water. These conditions result when the radiation dose intensity as a function of generator output and distance of penetration, time of radiation, monomer composition and temperature are controlled to effect formation of a smooth surface of hydrophilic polymer on the silicone, to prevent substantial migration of the monomer into the silicone and to prevent localized areas of high concentrations of hydrophilic polymer grafted to the silicone surface. By another method, silicone sheet is grafted to one side of a silicone film by a process analogous to the above and is then laminated to a silicone core.

DESCRIPTION OF SPECIFIC EMBODIMENTS

During co-irradiation of the silicone and the monomer in contact with the surface of the silicone, care must be taken to prevent substantial migration of the monomer into the silicone, to prevent localized non-uniform areas of high polymer concentration on the silicone surface and to prevent mechanical or physical-chemical stresses that distort the silicone surface when contacted with water while at the same time grafting sufficient monomer on the silicone surface to the render it hydrophilic. When these effects are not controlled properly, the resultant optical clarity of the product is sufficiently impaired to render it useless as a contact lens by reason of an irregular surface formed on the silicone and/or the formation of a grafted product which appears cloudy. These effects can be avoided by controlling the time of radiation, the radiation dose, the uniformity of radiation over the silicone surface, the monomer composition in contact with the silicone surface and the temperature of the silicone and monomer at which radiation is conducted. It has been found that in all cases in the practice of the present invention, the silicone and monomer must be subjected to high radiation doses for short periods, otherwise the undesirable results set forth above will occur. Even when employing these radiation conditions the composition of the monomer and temperature at which radiation is effected must be controlled and the degree of control is dependant primarily upon the particular monomer employed.

A. Useful Monomers

The monomers which can be employed in the present invention are of two classes: those which can be grafted to silicone by means of ionizing radiation and which lead directly to hydrophilic polymers, and those which can be grafted to silicone by means of ionizing radiation and which lead to polymers that by subsequent reaction techniques, for example hydrolysis, result in hydrophilic polymers.

Included in the class of monomers which lead directly to hydrophilic polymer are: N-vinyl pyrrolidone and the hydroxyalkyl methacrylates such as 2-hydroxyethyl methacrylate.

Included in the class of monomers which lead to nonhydrophilic polymers, which polymers can subsequently be rendered hydrophilic are:

glycidyl methacrylate, vinyl acetate (converted to poly vinyl acetate, thence to polyvinyl alcohol), and styrene (converted to polystyrene, then sulfonated polystyrene).

The problems which these monomers entail can be broadly considered under three categories:

(1) solubility of monomer in silicone polymer;
(2) monomer which, under ionizing radiation, forms a cross-linked tough or glassy gel;
(3) monomer initially homogeneous solution, upon polymerization, forms into two coexistent solution phases Each set of problems is considered hereunder.

B. Control of Monomer Solubility

It has been found that the use of solvents or diluents for the useful monomers of this invention can provide a means for balancing the driving force of the monomer into the silicone so that excessive monomer solubility in the silicone does not occur. The monomer or mixture of monomers should be soluble in the solvent. The solvents, by their solvation for the monomer, prevent monomer dissolution into the silicone to the extent that would occur if the solvent were not employed.

The desirable effects attained by adding solvent to reduce the solubility of the monomer in silicone also can be attained by adding to the monomer composition a polymer in which the monomer is soluble. For example, polyvinyl pyrrolidone (PVP) can be added to monomeric NVP to form a viscous solution. The PVP, like the solvent, acts to partition the monomer between the silicone and itself to lower monomer solubility in the silicone relative to what would occur when the PVP is not present. When employing a polymer in the monomer composition, low molecular weight polymer is preferred and the concentration of the polymer should be chosen so as to avoid tough or glassy gel which may physically distort the shape of the silicone. With a monomer of the methacrylate or acrylate type, gelation occurs only too easily and the addition of polymer to the monomer would be disadvantageous. In any event, the use of the polymer with methacrylate or acrylate monomers is not warranted since these monomers are not significantly soluble in silicones.

C. Control of Gelation

The hydroxyalkyl methacrylate monomers in undiluted state easily form cross-linked matter under ionizing radiation. which, depending on dose level and presence as contaminant of disubstituted esters such as ethylene glycol dimethacrylate, can vary from weak gel to tough and/or glassy matter. Probably this is because of the high kinetic chain length of acrylates and methacrylates, reflecting a high ratio of propagation velocity constant to termination velocity constant; thus rapid development of high molecular weight polymer with corresponding high viscosity leads further to the reduction of the termination velocity constant.

In any case it is impractical to use undiluted hydroxyalkyl methacrylates because the radiation dose necessary to cause grafting to a silicone surface will lead to a gel. Though the gel may be sufficiently fragile to be strippable from the silicone, such a procedure entails extra labor.

Thus, especially with the hydroxyalkyl methacrylate it is desirable to dilute the monomer with a solvent such as water glycol, glycerol, or the like prior to irradiation. This permits one to deliver a substantially higher dose of radiation to the silicone-monomer solution, thereby effecting grafting while avoiding gelation entirely, or while limiting cross-linking of the hydroxymethacrylate so that if gelation occurs, the gel is fragile and readily removed.

As will be obvious to one skilled in the art, a critical aspect of the use of hydroxyalkyl methacrylate is the content of difunctional (dimethacrylate) monomer. The greater the content of this contaminant, the more easily is the crosslinked state produced. Nonetheless, even highly purified monomer when exposed to ionizing radiation will undergo side group radical formation that, in combination with the long chain lengths of these polymers, leads to cross-linking beyond a certain percentage conversion of the monomer.

D. Phase Separation and Its Effects

When diluted with certain solvents, e.g. water, the hydroxyalkyl methacrylate monomers, initially in homogeneous solution, evolve into two phases upon polymerization, depending on solvent content. For example, 20% HEMA in 80% water solution is homogeneous. When exposed to a short, single dose of radiation of about 3 megarads, two phases evolve, one highly viscous, containing polymerized HEMA and the other more fluid, containing mostly water. Both phases are transparent.

This presents only a moderate nuisance when such solutions are used in contact with silicone to be rendered hydrophilic, if short single doses of radiation are used. However, since the viscous phase develops and settles on the silicones in a somewhat random manner, multiple dose radiation attempted after the phase separation has just occurred can only lead to erratic grafting owing to wide variations in the viscosity medium next to the silicone and to the concentration and diffusibility of monomer in it.

It has been found convenient to admix NVP with HEMA when otherwise phase separation will occur. By so doing NVP is copolymerized into the grafted hydrophilic polymer and, if the concentration of NVP is appropriate, e.g. 30 volumes NVP and 70 volumes HEMA, mixed together and dissolved in 400 volumes of water, single phase syrups are produced after radiation at levels appropriate for grafting to silicone.

It is to be emphasized that even when 20% HEMA - 80% water solutions are used, wettable silicone lenses result after suitable short, single dose irradiation and the adherent viscous phase of polyHEMA can with appropriate care be swabbed off or dissolved off in alcohol.

E. Radiation

The radiation dose should be delivered uniformly over the silicone surface, should be sufficient to effect grafting of the hydrophilic polymer as a thin smooth layer uniformly over the entire silicone surface and should be delivered over a period which is relatively short compared to the time for the monomer to penetrate into the silicone and grow upon previously grafted polymer chains on the surface to form localized areas of high hydrophilic polymer concentration on the silicone surface. In order to effect these results, it is necessary to employ high energy ionizing radiation in the order of one million electron volts or more such as produced by Van De Graaff generators. The radiation can be delivered either continuously or intermittently over a short period wherein either the dose or portion of the dose is delivered for a period of time of the order of up to about 60 seconds.

Generally when employing a monomer composition which, by reason of monomer solubility in the silicone, will promote rapid invasion of monomer into the silicone, the contact time after initial exposure to the liquid and the time of radiation should be short. When employing a monomer composition which does not promote rapid invasion of monomer in the silicone, one has more latitude in the contact time prior to irradiation but radiation times also should be short. Higher radiation doses delivered in short time periods favor uniform grafting at the silicone surface creating free-radical sites on the silicone surface in a relatively dense configuration from which nearly simultaneous grafting and polymerization of monomer can occur under nearly uniform conditions from one area to another at any point in time. For example, when employing pure NVP monomer, the maximum radiation dose that can be employed is about 2.5 megarads, if delivered in under 30 seconds, to obtain the desired smooth thin hydrophilic surface. Otherwise excessive homopolymerization occurs resulting in a roughened hydrophilic surface. On the other hand, when employing an aqueous solution of NVP, higher radiation doses can be employed while retaining the desired surface characteristics on the silicone. When employing a plurality of small radiation doses in sequence to effect grafting, the time of radiation of each dose also should be short and should be delivered within about 60 seconds. The period between doses also should be relatively short to prevent substantial monomer impregnation in the silicone. The particular period of time between doses will vary dependent upon the solubility characteristics of the particular monomer compositions being employed and usually should be no longer than up to about 90 seconds.

The silicone should be positioned with respect to the incident radiation to insure a reasonably uniform dose over its surface in contact with the monomer composition. In the particular case of a Van de Graaff generator the radiation arriving through air is at about 60% of the maximum dose level at the plane of impingement of the sample. As electrons begin to invade the monomer composition, the dose level increases and reaches a maximum as a consequence of secondary ionization and scattering of electrons including back scattering. The depth at which maximum ionization occurs is dependent upon the density of the irradiated substance and the voltage drop in the generator. For example, when radiation under a potential of 3 million electron volts is delivered by a Van de Graaff generator to silicone and monomer composition having densities of about 1 gram per cubic centimeter, maximum dosage occurs at about 0.5 centimeters from the surface of impingement. At lower beam voltages, the maximum radiation level occurs at reduced depth from the surface of impingement in proportion to the decreased voltage. Beyond the level of maximum dosage, the dose level decreases monotonically with increased distance and the dosage as a function of depth approximates a Gaussian distribution. Again, assuming a density of 1 gram per cubic centimeter, the dose level at one centimeter from the surface of impingement is reduced to about 40% of the maximum dose. Therefore, when it is desired to graft a hydrophilic polymer simultaneously to all surfaces of the silicone core, the depth of monomer composition between the source of ionizing radiation and the silicone surface is controlled so that both surfaces of the silicone receive approximately the same dosage uniformly over the respective surfaces so that uniform grafting of the hydrophilic polymer occurs over the entire surface of the silicone. Generally, the monomer composition depth and position of the silicone and monomer are controlled so that radiation on both levels does not vary much more than about 10% between the two surfaces of the silicone. It is to be understood that grafting can be effected to the two silicone surfaces sequentially if desired by contacting only one silicone surface with the monomer with sequential exposure of the contacted surface to ionizing radiation. Furthermore, if desired, each silicone surface contacted with monomer could be exposed to a separate source of ionizing radiation.

F. Monomer and Silicone Contact Procedures

The monomer composition and silicone can be contacted during exposure to ionizing radiation by any means which assures that the monomer is homogeneously distributed at the monomersilicone interface and that the radiation dose is uniformly distributed over the silicone surface. In one embodiment, a silicone composition shaped in the form of a contact lens is immersed in a pool of monomer composition so that the monomer contacts all surfaces of the silicone. The depth of the monomer between the source of radiation and the silicone surface is controlled so that ionizing radiation to which the silicone and monomer is subsequently exposed is distributed uniformly over the silicone surface. For example, with 3 million electron volts of ionizing radiation, a depth of monomer between the source of ionizing radiation and the silicone surface between about 1 and 2 mm has found to be satisfactory. With higher energy sources, greater depth can be tolerated in the manner describe above.

Alternatively, the silicone can be encased in a mold cavity contoured in the form of a lens with the surface of the mold in contact with the silicone surfaces coated with a thin layer of the monomer composition. The mold may be formed from quartz, glass, or stainless steel. When the mold is interposed between the radiation source and the silicone, it is essential to make the mold thickness uniform and as thin as mechanically practical. For example, with glass it is around 1½ mm. Preferably the mold surfaces are first coated with a polymer in which the monomer is soluble, and this coating is then wet with the monomer. The coated mold is then contactd with the silicone surface and the monomer and silicone are exposed to ionizing radiation.

A third embodiment, a contact lens is formed in a two step process wherein a silicone composition in the form of a thin sheet is contacted with a monomer composition on one surface of the sheet while the other surface is free from contact with monomer, and then subjected while in contact with the monomer composition to ionizing radiation. The resultant sheet is rendered hydrophilic only on one surface by reason of hydrophilic polymer being grafted thereto. Thereafter, a silicone composition in the form of a contact lens is intimately contacted on all surfaces with the surface of the sheet not rendered hydrophilic so that the outside surface of the final contact lens comprises the hydrophilic surface. Thereafter, the sheet and formed silicone, are subjected to ionizing radiation in the manner described above while in contact in a mold contoured in the shape of a lens. In the second step, the sheet and silicone core are grafted by virtue of the ionizing radiation.

In a fourth embodiment, a thin smooth sheet of hydrophilic polymer having a compatible monomer dissolved therein such as NVP in cross-linked PVP sheet, or NVP in cross-linked HEMA is contacted with the surfaces of a silicone core in a mold and subjected to ionizing radiation. The PVP is not adhered to the mold surface. During ionizing radiation, the NVP covalently bonds to the silicone and to the PVP thereby grafting the thin PVP sheet to the silicone core. The PVP functions as both the surface of the final lens and as a means for controlling NVP solubility in the silicone. The resultant lens is optically clear and hydrophilic on all surfaces.

In carrying out the radiation step, it is necessary to avoid mechanical or physical-chemical stresses on the silicone which would distort the silicone into a shape different from the desired contact lens shape since the radiation will cause the silicone to crosslink into a distorted permanent shape. Thus when the lens is submerged in a pool of monomer, it must be positioned by gentle mechanical restraints that do not distort the lens.

Furthermore, care must be taken to avoid a significant elevation of temperature during grafting which would cause the silicone to be distorted at normal use temperatures. The temperature of the silicone and monomer compositions will increase by virture of absorbed irradiation, which if heated adiabatically would cause a temperature rise of about 3° to 7° C for each megarad of radiation, depending on the specific heat of the substance being irradiated. Excessive temperature rise can be controlled by providing means for absorbing the heat generated. A simple means that can be employed is to provide a solvent for the monomer such as water having a relatively high heat capacity thereby avoiding excessive temperatures. Alternatively, conventional cooling means can be provided in the vessels containing the silicone and monomer. Furthermore, excessive temperatures also can be encountered by virtue of "runaway" exothermic polymerization characteristic of concentrated hydroxyalkyl methacrylate monomer during exposure to high doses of radiation. In any case, during irradiation the mean temperature of the monomer composition and the silicone should be approximately constant throughout the substance of both; otherwise locally accelerated polymerizations where the temperature is highest will lead to nonuniform and erratic grafting. Of course when molds are used to contain the monomer and silicone, no distortion is caused by the physical stresses since the silicone and monomer are caused to conform to the desired contact lens shape.

G. Silicones

Any silicone polymer copolymer and interpolymer composition can be employed so long as it is optically clear in the corneal area, has groups responsive to ionizing radiation by the formation of graft initiating free radical sites, and is oxygen permeable. Particularly suitable silicones are polydimethyl siloxane, polydimethyl co-vinyl-methyl-siloxane, polydimethyl co-phenyl-methyl-siloxane and in general interpolymers resulting from co-condensation of dimethyl silanols, methyl-vinyl silanols, phenyl-methyl-silanols, and diphenyl silanols: fluorosilicones in which the fluorine atoms are substituted to varying degrees substantially less than 100% with hydrogen atoms; "ABA" block polymers of siloxane wherein A represents for example polycarbonate blocks and B represents silicone blocks or wherein A represents polystyrene blocks and B represents silicone. The block copolymer crosslinks via the glassy domain provided by the polycarbonate or polystyrene moiety. An exemplary suitable triblock copolymer of silicone and polycarbonate is sold by General Electric Company under the name MEM-213. The silicone employed during co-irradiation thereof and the monomer need not be previously crosslinked. However, if the modulus of rigidity of the silicone (being higher, the higher the molecular weight) is not adequate to maintain a contact lens shape during co-irradiation, the piece should be confined to a mold imposing the contact lens shape. The silicone to be used in the corneal area of the contact lens can be free of filler or can contain a particular filler having essentially the same refractive index as the silicone, as for example silica in phenyl silicones, but should not be employed in concentrations which will cause turbidity. The use of reinforcing filler has the advantage of rendering the silicone composition of greater tear resistance and higher tensile strength.

GENERAL DESCRIPTION OF THE DRAWINGS

This invention will be more fully described with reference to the accompanying drawings.

DETAILED DESCRIPTION OF THE DRAWINGS

Figure 1:
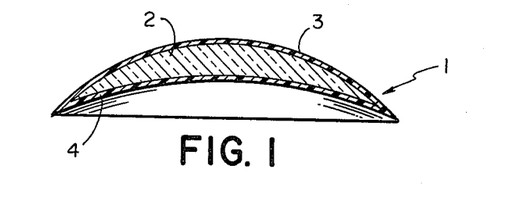
FIG. 1 is a cross-sectional view of a corneal contact lens made from a silicone having a hydrophilic polymer grafted thereto.

Referring to FIG. 1, a contact lens is formed from a crosslinked silicone core 2, a convex surface 3 and a concave surface 4 on which is covalently grafted a hydrophilic polymer. The hydrophilic polymer surface is sufficiently thick to render the contact lens 1 hydrophilic yet sufficiently thin to offer little additional resistance to oxygen transfer in excess of that presented by the silicone core 2.

Figures 2, 2A, 3, 3A:
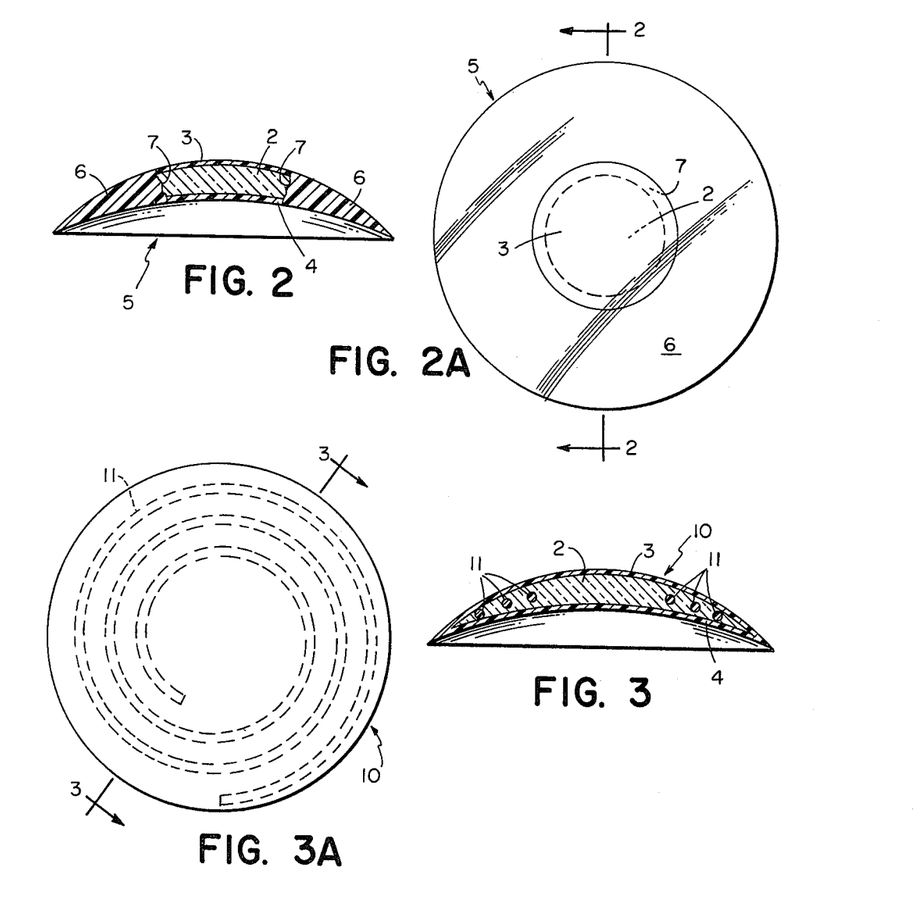
FIG. 2 is a cross-sectional view of a scleral silicone contact lens reinforced with tear-resistant material.
FIG. 2A is a top view of the lens shown in FIG. 2.
FIG. 3 is a cross-sectional view of an scleral silicone contact lens reinforced with a spirially wound filament.
FIG. 3A is a top view of the lens shown in FIG. 3.

Referring to FIG. 2 and 2A, a scleral contact lens 5 is shown having a peripheral reinforcing means 6 formed from a tough material such as silicone very heavily loaded with reinforcing filler such as fused silica. The contact lens 5 is formed by placing the reinforcing means 6 and uncrosslinked clear silicone into a mold so that the silicone fills the central portion of the reinforcing means and conforms to the roughened central edge 7 so that when crosslinked, the silicone core 2 forms at least a strong mechanical bond with the central edge 7 and preferably a covalent bond. As described above, a thin layer of hydrophilic polymer is attached covalently to the clear silicone core on both the convex surface 3 and the concave surface 4.

Referring to FIGS. 3 and 3A, a scleral contact lens 10 is formed from a crosslinked silicone core 2 having a reinforcing means comprising a spirally wound filament 11 located in the peripheral portion of the contact lens. The filament and uncrosslinked silicone are placed in a mold to form the shaped silicone having ultimately a hydrophilic convex surface 3 and concave surface 5 in a manner described above.

Figure 4:
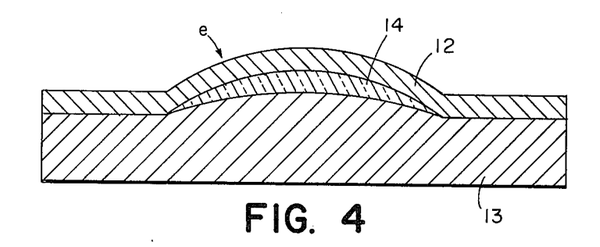
FIG. 4 is a cross-sectional view of two molding pieces enclosing silicone polymer undergoing irradiation.

Referring to FIG. 4, a concave mold 12 formed of silicate glass or fused silica, preferably having a uniformly thick curved wall presented between the silicone 14 and the radiation source (not shown) is clamped to a convex mold 13 by conventional means (not shown), thereby confining the original plastic silicone gum stock 14, which assumes the exact geometrical shapes imposed by the curved optical surfaces of the molds 12 and 13. Means for accommodating excess silicone are provided readily by channels (not shown) as is customary in injection molding. The silicone 14 confined between the two molds is irradiated by Van de Graaff or other ionizing radiation with a dose of 3 or more megarads. Following this procedure the silicone material 14, now crosslinked into a lens shape of precise is removed.

Figure 5A:
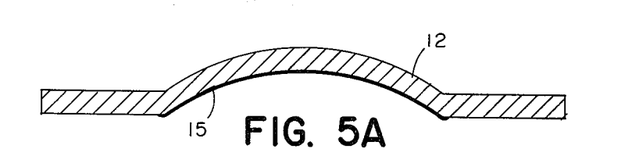
FIG. 5A is a cross-sectional view of the concave portion of a mold having a coating of a hydrophilic polymer solution.
Figure 5B:
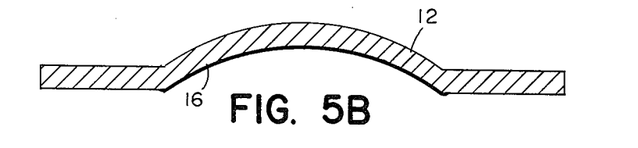
FIG. 5B is a cross-sectional view of the mold of FIG. 5A when the solution has dried.
Figure 5C:
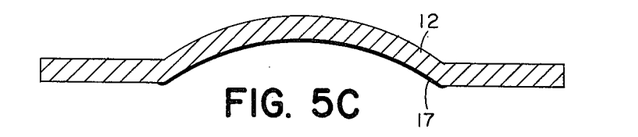
FIG. 5C is a cross-sectional view of the mold of FIG. 5B wherein the coating contains an aqueous solution of a monomer.

Either the same, or geometrically identical molds 12 and 13 are submitted to the following sequence of steps which are illustrated with particular reference to the concave mold 12 by FIGS. 5A, 5B and 5C. The same sequence of steps described below is applied to the convex mold 13. In the first step, a solution of polyvinyl pyrrolidone adjusted to a concentration of about 20 to 25% polymer, preferably in water, is applied to the inside surface of the mold 12 to form a coating 15 that is later to come in contact again with the previously crosslinked silicone lens. The polyvinyl pyrrolidone solution, because of its ready wetting of most surfaces and its modest viscosity spreads into a uniform film which may be further increased in uniformity by, for example, spinning the mold while held in a rotating chuck so as to allow centrifugal force to move excess solution radially outward. By simply pouring a small quantity of polyvinyl pyrrolidone solution into the hollow cavity of the mold and then pouring out the same, a fairly uniform film can be readily accomplished having a thickness of several thousandths of an inch. Next, the wet film is allowed to dry under dust free conditions sufficiently slowly so that no bubbles are formed until a hard glassy polymer layer 16 results uniformly coating the original surface. This glassy layer 16 has a thickness, depending upon the original solution thickness, of about 1 to 5 thousandths of an inch as is illustrated in FIG. 5B. The molding surface thus coated may be stored indefinitely. Just prior to the final step of grafting a hydrophilic monomer, the polyvinyl pyrrolidone layer 16 of the mold 12 is sprayed with or washed with very quickly, monomeric liquid N-vinyl pyrrolidone, the excess of which is immediately blown off, drained off, or spun off. By reason of the strong adhesion of the polyvinyl pyrrolidone film 16 to the mold substrate, the monomeric N-vinyl pyrrolidone now commences to dissolve in and swell the pyrrolidone layer 16 without causing it to migrate thereby forming layer 17. The polyvinyl pyrrolidone layer 16 thus becomes a reservoir for the monomer; a reservoir having a high viscosity to prevent lateral motion, and at the same time an osmotic retention of the monomer which lowers activity of the monomer significantly from that of the pure state. The convex mold 13 is treated similarly by the same steps so that just before the final grafting process, one has the concave mold and the convex mold whose optical surfaces have been coated with polyvinyl pyrrolidone, now wet with N-vinyl pyrrolidone ready for contact with the previously crosslinked silicone lens 14.

Figure 6:
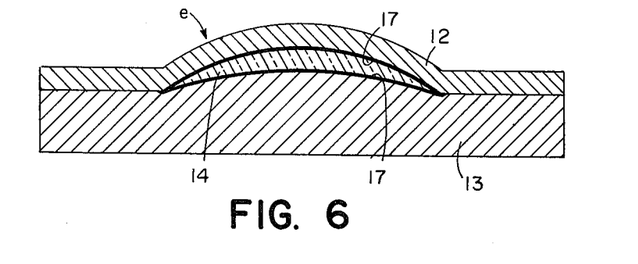
FIG. 6 is a cross-sectional view of a mold coated with hydrophilic polymer containing an aqueous solution of monomer and enclosing a silicone composition.

The previously molded lens 14 now is inserted back into the cavity which has exactly the same shape as the original cavity in every geometrical respect so that uniform contact is made between surfaces of the crosslinked silicone 14 and the now swelling N-vinyl pyrrolidone-polyvinyl pyrrolidone films 17. A second irradiation of the silicone now is accomplished, preferable about 3 megarads, while lens 14 is confined between molds 12 and 13 as shown in FIG. 6, this time with monomer in coating 17 in exact defined close contact. For this process the Van de Graaff generator is particularly suitable because of the speed with which the step can be executed (less than 1 minute). Following this step the two molds in FIG. 6 are parted, the lens 14 with a viscous coating of polyvinyl pyrrolidone grafted to the silicone is carefully peeled off, and the molds are separately washed free of their polymeric coating, while the lens is soaked in a washing solution for a period of time sufficient to remove all unreacted monomer and polymer that has not been covalently attached to the silicone surface. Upon completing the latter step, one has the lens of FIG. 1.

Figure 7:
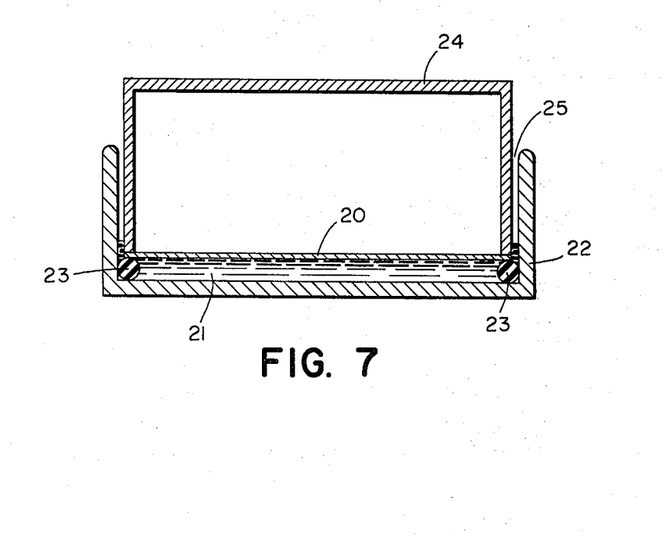
FIG. 7 is a cross-sectional view of apparatus employed to graft a hydrophilic polymer to one side of a silicone sheet.
Figure 8:
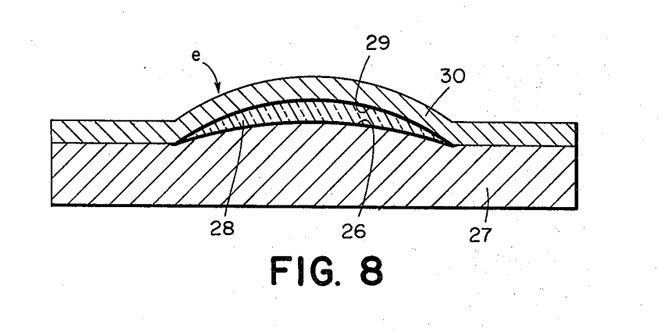
FIG. 8 is a cross-sectional view of a mold enclosing a silicone core which in turn is surrounded by a sheet made as describeed with reference to FIG. 7.

Referring to FIGS. 7 and 8, a ½ mil thick sheet of a triblock polycarbonate-silicone copolymer 20 is rendered hydrophilic on one surface by first placing the sheet as a membrane in uniform tension on the edge of a glass vessel 24, and then inverting this assembly on silicone supports 23 equally spaced around the inside periphery of the container 22. A 20% aqueous solution of NVP is poured into the space 25 between the container 22 and 24 to form a pool 21 below the sheet 20 which contacts only one surface of the sheet 21. A slight excess of the solution is poured to maintain a hydrostatic head of solution between the container thereby insuring contact of the solution with the entire area in one surface of the sheet 20. After the sheet 20 is positioned, it is subjected to 3.5 megarads of ionizing radiation within less than 30 seconds thereby rendering the sheet surface in contact with pool hydrophilic while the surface of contact with the pool retains its hydrophilic property.

The treated sheet then is grafted to all surfaces of a silicone core to form a contact lens. A portion of the treated sheet 26 is placed in a mold with the hydrophilic surface in contact with the surface of the mold portion 27. A silicone polymer or copolymer 28 is placed on the sheet 26 and a second portion of the treated sheet 29 is placed on the silicone 28 with its hydrophilic surface in contact with the silicone 28. The second portion of the mold 30 is placed on the sheet 29 and the silicone 28 is conformed to a lens shape. The silicone and sheets then are subjected to about 3 megarads of ionizing radiation to graft the sheets to the silicone and to crosslink the silicone. In this radiation step, no particular control of radiation dose and radiation time need be effected since the hydrophilic surface is formed previously and problems associateed with monomer dissolution in the silicone or uncontrolled hydrophilic polymer grafting are not encountered.

In general, the presence of a hydrophilic layer where found, in the following examples has been confirmed by one of more of the following tests:

(1) The specimen is immersed in an aqueous solution of toluidine blue 30 minutes, then rinsed and dried. A hydrophilic layer will always be found to have a residual blue stain observable against a white background by comparison with a control (plain slicone).

(2) After immersion in water for at least 10 minutes, and then removal, the hydrophilic layer will visibly support a film of water for many seconds.

(3) The receding contact angle is less than about 20°. (Advancing contact angles are nearly meaningless. For example, on hydrogel materials previously dried, the advancing contact angle can approach 90°. If the hydrogel is previously soaked for hours in water, the advancing contact angle, quickly measured, goes to 20° or less.)

The following examples illustrate the present invention and are not intended to limit the same.

EXAMPLE I

A pure polydimethyl siloxane elastomer, free of mineral contaminant of any kind, Stauffer-Wacker silicone No. 06804, was poured into place between two thin glass lenses of different radii of curvature to produce a liquid layer 1.0 mm thick at its center with a radius of about 1.3 cm. The resultant assembly was exposed to ionizing radiation under a 3.0 million electron volt Van de Graaff generator for about 60 seconds to produce a total dose of 5 megarad.

Following radiation crosslinking of the silicone, the glass-confining mold surfaces were cautiously removed and the crystal-clear colorless transparent silicone lens formed in the preceding process then was coated with a thin (approximately 3 mil thick) layer of the water-soluble monomer glycerol methacrylate dissolved in polyethylene glycol 400 to the extent of 20% by weight of monomer. The coated lens then was replaced in the mold and (filling it to the exclusion of air) was exposed again to 3.0 MEV ionizing radiation for 30 seconds with an additional dose of 1 megarad.

The resulting lens had a smooth surface and was water wettable on both sides. The oxygen permeability of this lens is 6-fold greater than that of a lens of equivalent shape prepared from any type of hydrogel of the same shape and thickness.

EXAMPLE II

Stauffer-Wacker silicone gum No. 06093, a polydimethyl co-vinyl-methyl siloxane polymer containing 0.11 weight % vinyl unsaturation and completely devoid both of mineral filler of any kind and of any vulcanizng agent, was pressed between two concave surfaces prepared from Plexiglas (®), having different radii of curvature so as to define a lens of maximum thickness ½ mm and radium 0.8 mm. Prior to pressing the silicone between these surfaces, each surface was covered with a film approximately 3 mils thick, of wet gel cellophane that had been transferred from its initial water bath into a 50 percent aqueous solution of glycerol methacrylate and saturated therewith. Excess liquid was removed from the gel cellophane by swabbing prior to pressing the silicone between the wet gel cellophane surfaces. After pressing the silicone between the wet gel cellophane surfaces, the assembly was exposed to a total of 10 megarads of ionizing radiation from a 2 million electron volt Van de Graaff generator, with 3 megarad exposure for 30 seconds from one side and 2 megarad exposure for 30 seconds from the other side. Upon release from the mold, the wet gel cellophane when remoistened with water, was easily stripped away from the silicone. The silicone, now crosslinked, was found to have smooth surfaces, and to be water wettable on both interior and exterior surfaces, as a consequence of the grafting of glycerol methacrylate thereto.

EXAMPLE III

Contact lens cores formed from crosslinked Stauffer-Wacker 06093 were immersed in 5 cc of different liquid monomers which when polymerized form a hydrophilic polymer. Three liquid monomers were employed namely: N-vinyl pyrrolidone, 2-hydroxyethylmethacrylate and a mixture of 60% glycerol and 40% hydroxyethylmethacrylate by volume. The crosslinked silicone lenses being only very slighly less dense than the liquids were substantially completely covered by the liquid moving freely therein in a state of near neutral buoyancy. Each liquid was maintained at a depth of about ¾ of a centimeter. Each silicone lens floating in the monomer was passed under a Van de Graaff generator being operated at 3.7 million electron volts in one pass for 30 seconds, the total dose delivered being 2.5 megarads. In each case, the resultant lens formed was not usable as a contact lens. Following irradiation, the N-vinyl pyrrolidone monomer had become a viscous syrup, the HEMA had become a tough firm gel and the mixture of HEMA with glycerol had turned in a cheese-like, easily-cut gel. The lens from the N-vinyl pyrrolidone syrup was excellently wettable by water but had a severely wrinkled, orange skin-like surface, with extensive wave-like formations thereon. The lens in the HEMA became rigidly entrapped therein and could not be removed without destruction. The lens irradiated in the presence of 40% HEMA, 60% glycerol was water wettable after removal from the gel but suffered significant surface wrinkling.

As was subsequently demonstrated, satisfactory results are obtained by decreasing the concentration of the monomer.

EXAMPLE IV

The procedure of Example III was repeated with the exception that irradiation doses varying between 0.5 megarads and 2.5 megarads, requiring about 30 seconds, were applied to silicone lenses floating in either N-vinyl pyrrolidone or a mixture of 40% HEMA and 60% glycerol by volume. The results are shown in Table I.

Table I

| Test | Monomer | Dose Megarads | Temperature Rise | Post Irradiation Condition of Monomer | Observation Qualities of lens |
|---|---|---|---|---|---|
| 1 | NVP no solvent | 0.5 | ca 5° C. | Thin syrup infinitely diluted by addition of water | Hazy dry; optically clear, wet; excellent wetting |
| 2 | NVP (pure) no solvent | 1.0 | ca 5° C. | Syrup, soluble in water | Hazy when dry; optically clear when wet; excellent wetting |
| 3 | 40% HEMA 60% Glycerol | 1.0 | ca 5° C. | Cheese-like gel, swells but does not dissolve in water | Lens surface distorted |
| 4 | NVP no solvent | 1.0 | ca 5° C. | Syrup, soluble in water | Hazy when dry; optically clear, wet; excellent wetting |
| 5 | NVP no solvent | 2.5 | Smoking hot | Viscous syrup, soluble in water | Severely wrinkled surface; excellent wetting |

As shown in Table I, the lenses obtained when employing an irradiation dose of 1.0 megarads or less where optically clear and had a surface having excellent water wetting and were suitable as contact lenses. On the other hand, a lens exposed to pure NVP under a 2.5 megarads dose delivered in about 30 seconds had a severely wrinkled surface and therefore was not suitable as a contact lens. The silicone immersed in the 40% HEMA and 60% glycerol which was exposed to a radiation dose of 1.0 megarads formed a distorted lens and therefore was not suitable as a contact lens. The temperature rise during irradiation was insignificant for sample 1 through 4, but sample 5 was smoking hot with evident rapid vaporization of monomeric N-vinyl pyrrolidone after irradiation.

EXAMPLE V

A lens was molded from the General Electric MEM-213 block copolymer (carbonate-siloxane-carbonate) at 200° C. This material has a high tear resistance and good optical clarity.

The lens was immersed in cold 20% solution of N-vinyl pyrrolidone in water to a depth of 5 mm and immediately irradiated (within 10 seconds) with a dose of 3.5 megarad delivered in 30 seconds from a Van de Graaff generator operating at 3.7 million electron volts.

The lens produced wet well in water and was optically clear. It had excellent tear resistance.

EXAMPLE VI

A laminated lens was made as follows. G.E. MEM-213 block copolymer as a 1 mil preformed membrane was applied to both sides of a pellet of Stauffer-Wacker gum 06093 that had been preformed into the lens shape 14 to FIG. 6. The MEM-213 assumed that positions shown in 17 in FIG. 6. In this configuration the laminate was exposed to 10 megarads of radiation from a 3.7 mev Van de Graaff generator, which produced a crosslinked composite with the block copolymer surfaces bonded to the conventional silicone (Stauffer-Wacker 06093).

This composite lens was then immersed in a 5 mm layer of 20% N-vinyl pyrrolidone in water and exposed to 3.5 megarad of radiation over a period of 30 seconds, at 3.7 MEV. The finished lens was clear, tough, and water wettable.

EXAMPLE VII

A silicone lens formed from Stauffer-Wacker silicone No. 06093 was immersed in a monomer mixture consisting of 10% NVP and 90% HEMA with no solvent and was exposed to a total dose of ½ megarad in two equal passes each lasting 15 seconds with an interval of about 60 seconds between passes. The lens was rendered wettable and had a slightly roughened surface. Improvement in the lens would be effected by mixing the monomer composition with a diluent or solvent such as water to retard monomer solubility in the silicone and by increasing the radiation dosage to improve the wettability characteristics of the lens.

EXAMPLE VIII

A silicone lens formed from Stauffer-Wacker silicone 06093 was immersed in pure NVP monomer and exposed to two passes of radiation from a Van de Graaff generator of ¼ megarad each for a period of 30 seconds and with an interval of 30 seconds each between passes. The resultant grafted silicone lens was removed from the NVP and transfered into a pool of pure HEMA monomer and was radiated again with a dose of ¼ megarad to 30 seconds. The lens then was removed from the HEMA and was found to be stained slightly and uniformly with toluidine blue and had a smooth surface. Slightly hazy when dry, it became nearly transparent when soaked in water.

EXAMPLE IX

Silicone lens formed from Stauffer-Wacker 06093 silicone were immersed in pools of pure NVP and subjected respectively to ¼, ½ and ¾ megarad doses in stages of ¼ megarad each; each pass lasting approximately 15 seconds with an interval of 60 seconds between each pass. The lens are radiated with ¼ megarad was completely clear when dry and almost nonwettable. The lens exposed to ½ megarad was slightly hazy when dry and when immersed in water lost its haze so that it appeared clear. The lens exposed to ¾ megarad was significantly opalescent when dry and when placed in cold water became nearly clear and sank to the bottom of the container clearly demonstrating a very significant water pick up and extensive grafting.

This example as compared to Example IV, shows that when employing pure NVP, it is preferable to expose the silicone and monomer to ionizing radiation in one brief pass rather than it multiple passes since the time required for multiple passes allows the NVP to invade previously grafted by hydrophilic polymer to an undesirable extent.

EXAMPLE X

A silicone lens formed from Stauffer-Wacker 06093 silicone was immersed in a pool of monomer containing 80% NVP and 20% water. Ionizing radiation was administered at ¼ megarad level and 3 passes for a total dose of ¾ megarad with exposure during each pass lasting about 30 seconds and with a 60 second interval between passes. The finished lens was optically clear, had a smooth surface and was extensively wettable with water as evidenced by its sinking in a water bath.

This example illustrates that better control of NVP monomer invasion into the silicone can be obtained by employing water as a diluent in the monomer composition.

EXAMPLE XI

A silicone lens made from Stauffer-Wacker 06093 silicone was immersed in a pool of monomer consisting of 80% HEMA and 20% NVP and was exposed to a total dose of ¾ megarad in 3 passes at ¼ megarad each for 30 seconds. The time between passes was about 60 seconds. The resultant lens exhibited good wetting as evidenced by uniform staining with toluidene blue but was slightly opalescent both when dry and when wet. This example illustrates that with a multi-pass technique for subjecting the silicone to ionizing radiation, excessive monomer invasion in the silicone occurred. Thus, with this monomer composition it is preferable to expose the silicone and monomer to a higher level of radiation in one pass, and preferably with the addition of a diluent.

EXAMPLE XII

A large circular disc of silicone, 2 mm thick, formed from Stauffer-Wacker 06093 silicone was floated on a solution of about 50% NVP and 50% polyvinyl pyrrolidone and was exposed to 1 megarad of ionizing radiation in 4 passes of ¼ megarad each for a time of about 30 seconds for each pass and within a total time of approximately 4 minutes. A second piece of the same silicone was treated similarly and then exposed to an additional dose of 1 megarad delivered in one pass within 30 seconds so that the total dose was 2 megarads. The upper surface of these discs was exposed to the air and thus was not in contact with the monomer whereas the lower surfaces were in contact with the monomer. In both instances the silicone after irradiation and cleaning stained uniformly with toluidene blue with the first one producing a light stain and the second one a more intense blue stain. The first lens had a film of marginal wettability whereas the latter lens held a film of water for a significant period of time. This example illustrates that polyvinyl pyrrolidone can be admixed wih an NVP monomer composition to control NVP invasion into the silicone to an extent which permits exposing the silicone and monomer to ionizing radiation in multiple passes.

EXAMPLE XIII

A silicone lens formed from Stauffer-Wacker 06093 silicone was immersed in a pool consisting of 20% NVP and 80% water and exposed to 3.75 megarad radiation in one pass of 30 seconds. When dried, it had approximately a 0.05% weight gain, but when exposed to water, the hydrophilic layer in the polymer was found to contain approximately 95% water and 5% grafted PVP. The lens was clear blue both dry and wet and wettable by water when withdrawn from water. A second lens was made similarly but immersed in a solution of 20% HEMA of exceptional purity containing only a trace of the difunctional monomer ethylene glycol dimethacrylate, and 80% water with the radiation exposure dose rate and timing being the same. The lens was found to have grafted to it approximately ½ of its initial weight in the form of anhydrous polyHEMA, and when fully wet out in water the weight gain of this film amounted to approximately 50% (polymer content 50% in the hydrophilic layer). The NVP-water solution became more viscous but remained homogeneous. On the other hand, the HEMA-water mixture separated into two coexistent phases, the more dense being more viscous and having a higher content of polyHEMA. Each of the coated lenses obtained was water wettable. Whereas the lens in contact with NVP solution is easily rinsed by water, the lens in contact with the HEMA-polyHEMA-water mixture as produced by irradiation requires more care. Upon contact with rinse water, the adherent polymer whitens and appears to coagulate. It can be removed from the silicone by persistent rubbing, leaving a water-wettable, clear surface.

EXAMPLE XIV

Examples XIV and XV illustrate the inoperativeness of a process wherein a silicone and monomer are co-irradiated over relatively long periods of 30 minutes or more.

Discs of silicone formed from Stauffer-Wacker 06093 silicone were immersed in three separate containers labeled respectively A, B and C; with A containing 20% NVP, 80% water; B containing pure NVP; and C containing 20% HEMA, 80% water. The containers were exposed to a cobalt 60 source and were exposed to a total radiation of ¾ megarad delivered in 3 hours, 15 minutes. Thereafter, the silicone disc in container A was found to be imbedded in a clear gel and was found to be nonwettable. The disc in container B was found to be imbedded in a hardened NVP resin covered with a viscous syrup. The disc from container B was removed by continuous application of hot water, was washed and dried and when dried was found to have a milky color and to have increased in total volume by about 200 percent. This demonstrates very extensive grafting of NVP into the silicone. The same disc, when immersed in water, swelled again to a final water content of about 30% based on the original polymer. The turbidity of the silicone was such as to render its useless as a contact lens. The monomer composition in container C was converted into a sponge-like, non-sticky gel from which water was expressed upon the gentlest touch. The disc was gently torn away from the gel and was found to have grafted significant quantities of HEMA as revealed by toluidene blue staining, but the surface was too tough, rendering it useless as a contact lens.

EXAMPLE XV

A single dose of ¾ megarad was delivered in 30 minutes from a Van de Graaff generator to silicone pieces maintained in the same solutions as used in containers A, B and C as set forth above. Upon removal from the solution, the lenses, although water wettable were somewhat turbid and useless as contact lenses.

EXAMPLE XVI

Silicone lenses formed from Stauffer-Wacker 06093 silicone were placed in a solution consisting of 80% water and 20% mixed monomer in which the ratio of 2 monomers was respectively one part NVP to four parts HEMA or three parts NVP to seven parts HEMA. These lenses were exposed to a total dose of 4.5 megarads delivered in approximately 30 seconds. The lenses recovered from the solutions were found to be very wettable by water, were found to have smooth surfaces and were optically clear, thus being suitable as contact lenses. The solution containing a 3/7 ratio of NVP/HEMA after polymerization under ionizing radiation was found to be homogeneous. The 20/80 NVP/HEMA solution showed incipient phase separation after exposure to radiation. This is in contrast to the result obtained with only HEMA in water, e.g., 20% HEMA - 80% water, which under identical radiation conditions leads to extensive phase separation in the monomer composition.

EXAMPLE XVII

In accordance with the procedure described above with reference to FIGS. 7 and 8, one-half mil thick membrane of the triblock copolymer of silicone and polycarbonate, General Electric MEM-213, was placed on the circumference of 40 mm Petri dishes, which were then inverted into larger dishes positioned above the floors of the larger dishes by three silicone supports. Three different monomer solutions A, B, and C were made comprising respectively 20% NVP and 80% water, 20% HEMA and 80% water; and 4% NVP, 16% HEMA and 80% water. Each solution has poured to fill the space between the bottom surface of the Petri dish and the triblock copolymer film and in addition a hydrostatic head of about ½ cm. was employed to assure contact of the film and the monomer composition. Thereafter, each sample was subjected to ionizing radiation from a Van de Graaff generator so that the maximum dosage of about 3.5 megarads was obtained at the membrane. Radiation was accomplished in one pass within less than 30 seconds. Each of the irradiated films was found to have a hydrophilic smooth surface, to be optically clear and to water wettable on the surface previously contacted with the monomer composition. A control membrane (not irradiated) under the same conditions is not water wettable.

While an aqueous solution of NVP accomplished the desired results, it has been found that pure NVP attacks the triblock copolymer and dissolves it.

Each of the hydrophilic membranes then was placed on both sides of a previously roughly molded contact lens formed from uncrosslinked silicone, Stauffer-Wacker 06093 silicone and reinclosed between the original mold so that the films, with their grafted sides outwardly toward their molds and there unreacted sides inwardly facing the 06093 gum stock, were compressed to form a tri-laminate. The laminate held in the original mold was exposed to 15 megarads irradiation with a Van de Graaff generator. The lens thus formed was clear, wettable on both interior and exterior surfaces and had improved resistance to tear by reason of the triblock copolymer surface layers.

Although this invention has been described with specific reference to preferred embodiments, it is contemplated that modifications and variations of the procedures set forth will occur to those skilled in the art familiar with the principles herein stated, and that such may be made without departing from the scope of this invention. Applicant has discovered that when a silicone polymer surface is contacted with the precursor monomer and subjected to ionizing radiation, there may be a tendency for the monomer to migrate into the silicone with adverse optical effects. Also the precursor may polymerize non uniformly on the surface or excessively to a condition of gellation whereby the silicone becomes embedded in polymer. In general the invention herein described may be characterized as methods by which a surface layer may be grafted to the silicone polymer by exposure to ionizing radiation of high dose level and short duration without causing the surface to lose the optical qualities requisite for a contact lens. These methods involve controlling the conditions of treatment so as to avoid excessive migration of the precursor into the silicone and non uniform or excessive polymerization of the precursor.

Having thus disclosed my invention and described in detail preferred embodiments thereof I claim and desire to secure by Letters Patent:

1. An optically clear, oxygen-permeable contact lens comprising a core formed from a crosslinked silicone polymer or copolymer having groups responsive to ionizing radiation by the formation of graft initiating free radical sites and an optically smooth surface layer formed from a hydrophilic polymer produced by the free-radical polymerization of at least one vinyl monomer, said layer being grafted to the core by the direct addition of said vinyl monomer to free radical sites produced on or from said groups by ionizing radiation without the intervention of oxygen.

2. The lens of claim 1 wherein the hydrophilic polymer is generated from a mixture containing N-vinyl pyrrolidone and hydroxyethyl methacrylate.

3. The lens of claim 1 wherein the hydrophilic polymer is generated from a liquid containing hydroxyethyl methacrylate.

4. The lens of claim 1 wherein the hydrophilic polymer is generated from a liquid containing N-vinyl pyrrolidone.

5. An optically clear, oxygen-permeable contact lens comprising a core formed from a crosslinked silicone polymer or copolymer having groups responsive to ionizing radiation by the formation of graft initiating free radical sites, and a silicone copolymer sheet grafted to both surfaces of said core, one surface of said sheet comprising a smooth outside surface layer of a hydrophilic polymer produced by the free-radical polymerization of at least one vinyl monomer, said layer being grafted to the core by the direct addition of said vinyl monomer to free radical sites produced on or from said groups by ionizing radiation without the intervention of oxygen.

6. An optically clear, oxygen permeable contact lens comprising a core formed from a crosslinked silicone polymer or copolymer and an optically smooth surface layer grafted to the core comprising a hydrophilic polymer, said lens having been made by the following method:

contacting a surface of the silicon polymer or copolymer in the shape of a contact lens or lens element uniformly with a liquid containing free-radical polymerizable precursor to said hydrophilic polymer or copolymer, exposing said surface while in contact with said precursor to dosage of high energy ionizing radiation sufficient to form a hydrophilic surface on said lens or lens element during a total time which is short compared to the time required for the precursor to penetrate into the silicone polymer or copolymer and to form localized areas of high hydrophilic polymer or copolymer concentration on the silicone surface and controlling the intensity and duration of radiation and the concentration of precursor to prevent excessive migration of precursor into the silicone polymer or copolymer thereby causing said precursor to graft to said surface while preventing non-uniform and excessive polymerization of the precursor, and thereby producing a thin smooth hydrophilic layer uniformly over the entire silicone surface.

* * * * *